United States Patent
Zanetti et al.

(10) Patent No.: US 10,949,377 B1
(45) Date of Patent: Mar. 16, 2021

(54) MULTIMEDIA CABLE WITH DEDICATED INFRARED CHANNEL

(71) Applicants: Luca Zanetti, Orlando, FL (US); Silvia Fioravanti, Orlando, FL (US)

(72) Inventors: Luca Zanetti, Orlando, FL (US); Silvia Fioravanti, Orlando, FL (US)

( * ) Notice: Subject to any disclaimer, the term of this patent is extended or adjusted under 35 U.S.C. 154(b) by 0 days.

(21) Appl. No.: 17/066,294

(22) Filed: Oct. 8, 2020

Related U.S. Application Data

(63) Continuation-in-part of application No. 16/749,280, filed on Jan. 22, 2020, now abandoned.

(51) Int. Cl.
*G06F 13/42* (2006.01)
*H04B 10/40* (2013.01)

(52) U.S. Cl.
CPC ......... *G06F 13/4282* (2013.01); *H04B 10/40* (2013.01)

(58) Field of Classification Search
CPC .......................... H04B 10/40; G06F 13/4282
USPC .......................................................... 398/135
See application file for complete search history.

(56) References Cited

U.S. PATENT DOCUMENTS

| | | | | |
|---|---|---|---|---|
| 8,769,172 B2 * | 7/2014 | Soffer | ..................... | G06F 13/00 710/64 |
| 10,241,283 B1 * | 3/2019 | Shen | ..................... | G02B 6/4246 |
| 2014/0126421 A1 * | 5/2014 | Lida | ........................ | H04L 49/10 370/254 |
| 2018/0332371 A1 * | 11/2018 | Suzuki | ............... | H04Q 11/0005 |
| 2019/0013889 A1 * | 1/2019 | Shintani | ................... | H04N 7/22 |
| 2019/0146169 A1 * | 5/2019 | Grandidge | ........... | G02B 6/4284 375/257 |
| 2020/0092621 A1 * | 3/2020 | Suzuki | ................. | H01R 31/065 |
| 2020/0142639 A1 * | 5/2020 | Yamamoto | ....... | H04N 21/43635 |
| 2020/0233160 A1 * | 7/2020 | Lee | .......................... | G02B 6/38 |
| 2020/0322054 A1 * | 10/2020 | Bai | ........................ | H04B 10/27 |
| 2020/0382214 A1 * | 12/2020 | Ori | .......................... | H01S 5/022 |

* cited by examiner

*Primary Examiner* — Dalzid E Singh
(74) *Attorney, Agent, or Firm* — Barry Choobin; Patent 360

(57) ABSTRACT

The present invention is directed to an assembly for communicating an external signal over a control channel of an HDMI cable. The assembly includes a first logic block, a second logic block, a transmitter, and a receiver. The first logic block and the second logic block each coupled to the opposite end of the cable and configured to dynamically or manually switch the control channel between an inline mode and a bypass mode. The receiver and the transmitter electrically connected to the first logic block and the second logic block respectfully. The receiver receives the external signal, the first logic block transmits the external signal to the second logic block over the control channel in the bypass mode. The transmitter on receiving the external signal from the second logic block transmits the external signal to the destination device.

11 Claims, 4 Drawing Sheets

MULTIMEDIA CABLE WITH DEDICATED INFRARED CHANNEL

CROSS-REFERENCE TO RELATED APPLICATIONS

This application is a continuation-in-part of a U.S. non-provisional application Ser. No. 16/749,280 filed on Jan. 22, 2020, which is incorporated herein by reference in its entirety.

FIELD OF INVENTION

The present disclosure relates to an assembly for transmitting external signals on an HDMI interface, and particularly to an assembly for injecting infrared/serial-communication signal on an HDMI interface.

BACKGROUND

Cables are indispensable for connecting electrical appliances. The cables are used to transmit data between the electrical appliances. Multimedia cables, such as an HDMI cable connect a multimedia sink device, such as a TV, monitor, projector with a multimedia source device, such as a set-top box. Besides the audio-video data, the HDMI interface also transmits control signal.

HDMI (high-definition multimedia interface) has become a standard for transmitting high-resolution audio and video data. HDMI transmits uncompressed video data and compressed or uncompressed audio data. Standard HDMI cables are used for multimedia devices and have a bandwidth capacity of 5 Gbps. While high-speed HDMI cables can support up to 8K resolution video by providing a bandwidth capacity of 48 Gbps. The newer Premium HDMI cables may also have an HDMI Ethernet Channel (HEC) that allows multiple HDMI connected devices to connect to a common router. Nowadays, most of the multimedia devices are incorporated with HDMI capabilities. Thus, HDMI allows for connecting different devices at home, such as TV, monitor, camera, projector, set-top box, DVD player, Blu-ray player, and like. In a typical HDMI cable, audio and video data can be transmitted through twisted pairs of copper cables. Generally, the transmissions minimized differential signaling (TMDS) channels transmit the audio and video data signals. A TMDS clock allows the devices to synchronize the incoming data. The three TMDS channels, each having a twisted pair of copper cables and a TMDS clock have a shield to isolate the channels from external interferences. The TMDS channels and shield forms a major part of the HDMI cable. The HDMI also contains a single control channel referred to as the CEC channel. Consumer Electronic Control (CEC) is a protocol used to control devices that are attached to the HDMI cable. The CEC channel allows the two connected devices to communicate. CEC features may include routing control, standby, system information, and feature abort. Other, optional features may include one touch recording, deck control, tuner control, On Screen Display (OSD) display, OSD name transfer, device menu control, RC pass-through, power status and vendor-specific commands. A typical HDMI may also include a HOTPLUG detect channel that can detect if a device is plugged and unplugged. A display data channel (DDC) carries device information and HDCP encryption information. Also, channels for electricity to power communication between the devices are included in the HDMI.

To remotely control the multimedia devices, the use of infrared-based remote controls are quite common. However, for the IR based remote control to work, the remote control should be in line-of-sight with the multimedia device. A typical home nowadays has numerous multimedia devices each having its remote control. The multimedia devices at home can be installed at distant locations. For example, HDMI may connect a TV with a set-top box, Blu-ray player, gaming console, stereo system, and like multimedia devices. Not all these multimedia devices may be placed near the TV. A set-top box can be installed in a room other than the room in which TV is installed. A user watching TV has to go to another room to operate the set-top box. This can be inconvenient and also multiple remotes can add to the trouble. Thus, a need is appreciated for a device that can allow remote operating the multimedia devices interconnected connected through HDMI.

SUMMARY OF THE INVENTION

The principal object of the present invention is therefore directed to an assembly for transmitting an external signal on an HDMI interface.

It is an additional object of the present invention that the assembly can automatically switch between external signal transmission and normal HDMI function.

It is still an additional object of the present invention that the assembly allows manual switching between a control channel between an inline mode and a bypass mode.

It is still another object of the present invention that the assembly is economical to manufacture and power-efficient while providing the IR remote control functionality.

In one aspect, disclosed is an assembly for use with a standard HDMI cable for transmitting an external signal on one or more channels of the HDMI. In one implementation, one or more channels include the CEC channel or an HEC channel. The disclosed assembly includes a first logic block and a second logic block, each configured to couple to opposite ends of the HDMI cable. The HDMI can be copper-based, or an optical fiber-based HDMI cable.

In one aspect, each the first logic block and a second logic block can be configured in an HDMI connector. In another aspect, the first logic block and a second logic block can be distinct devices in the form of an adaptor that can be connected between the HDMI cable and the source/sink HDMI ports.

In one aspect, the assembly disclosed herein can sense an external signal from an IR remote control or another device, and upon receiving the external signal, the assembly can switch the CEC or HEC channel from inline mode to the bypass mode for transmitting the external signal. The external can be transmitted between the first logic block and the second logic block.

In one aspect, disclosed HDMI cable is having HDMI connectors its ends. The two HDMI connectors can be configured with the two logic blocks disclosed herein. Each HDMI connector can also be configured with a serial port. In one implementation, the serial port is configured in the HDMI connector. In one implementation, the serial port can extend through a wire of a predetermined length. The serial port can connect with an IR eye. The IR eye can be an IR transmitter and an IR receiver. The IR eye configured to connect through the serial port.

In one aspect, the assembly disclosed herein is having an integrated and dedicated IR functionality to facilitate the remote control of IR based multimedia devices, such as TV, media players, set-top boxes, disk players, AV receivers, Bluetooth devices, home automation devices, and like multimedia devices.

In one aspect, the IR receiver can receive a command from an IR remote control. The IR command can be sent by the first logic block over the CEC or HEC channel to the second logic block.

In one case, an IR eye can act both as an IR transmitter and an IR receiver. The IR receiver of the first IR eye can send commands to the IR transmitter of the second eye. Similarly, the IR receiver of the second eye can send IR commands to the IR transmitter of the first eye. Both the IR transmitters can send commands to the multimedia devices. Both the IR receivers can receive the IR commands from an IR remote control.

In one aspect, the two IR eyes can be directly connected to the disclosed HDMI cable. Alternatively, the IR eyes can connect through connectors or jacks, such as a 3.5 mm jack. Serial ports for the 3.5 mm connectors can be inbuilt into the housing of the HDMI connectors or the serial ports can be configured in adaptors, as the case may be.

In one aspect, the IR eye acting as an IR transmitter can be installed in line-in-sight of the IR eye of the multimedia device. The IR eye can be installed using methods known to a skilled person, such as using an adhesive. In one case, the IR eye can be installed in front of the TV. The IR eye acting as an IR receiver can be installed at a location such as to be in line-in-sight of the remote control.

These and other objects and advantages of the embodiments herein will become readily apparent from the following detailed description.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
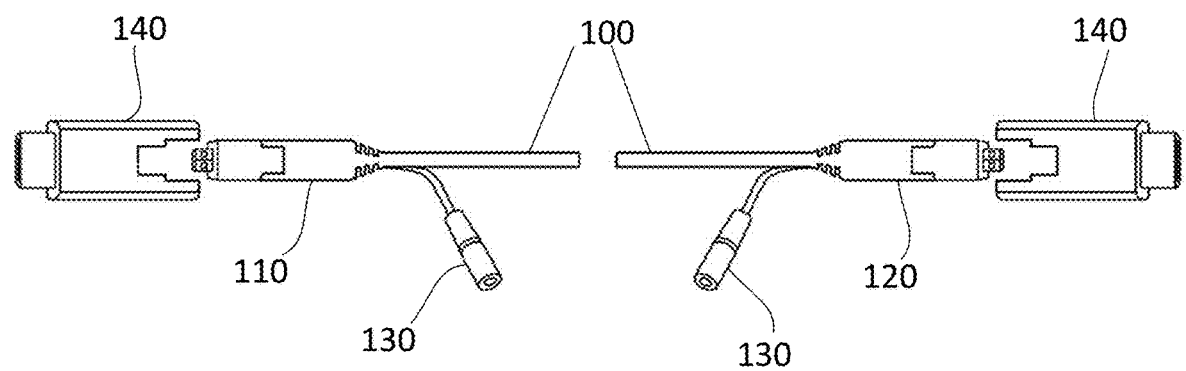
FIG. 1 shows an HDMI cable having two HDMI connectors at its opposite ends, a serial port extend from each HDMI connector. Also, shown is an HDMI adaptor for converting micro/mini HDMI plug interface to regular size HDMI plug, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation.

Disclosed is an assembly for transmitting an external signal on an HDMI interface. The external signal can be IR signal received from remote control for controlling a multimedia device. For example, the IR signal can be received from the remote control to turn the TV On or increase the volume of a set-top box. The external signal can be any external signal that can be transmitted through one or more channels of the HDMI cable. Preferably, the externals signals can be transmitted on a CEC or HEC channel. More preferably, the external signal can be transmitted on a CEC channel of the HDMI cable.

The HDMI cable can be any standard HDMI cable for audio-video transmission. CEC channels are common in HDMI channels while the premium HDMI cables can also be equipped with Ethernet (HEC) channels. The assembly disclosed herein can dynamically inject an external signal over CEC or HEC while the HDMI cable connects the source and sink devices. The assembly disclosed herein is configured to switch between external signal transmission (bypass mode) and regular function of an HDMI cable (inline mode) i.e. transmitting audio-video data, and related control signals between the source device and the sink device.

The assembly disclosed herein includes a first logic block and a second logic block, wherein the first logic block and a second logic block are a circuitry for receiving and transmitting an external signal over control channels of an HDMI. Now referring to FIG. 1, which shows an HDMI cable 100. The HDMI cable 100 can be a standard copper-based HDMI cable having at least a CEC channel. The HDMI cable 100 may also include an HEC channel. The HDMI cables can also be an AOC HDMI cable having one or more copper wire control channels. Perhaps, the cable 100 can be any cable having channels exclusive for sending control commands similar to a CEC channel. Preferably, the cable 100 can be an audio-video cable having a dedicated control channel, such as a CEC channel.

The HDMI cable 100 shown in FIG. 1 is having two ends, wherein each end is configured with an HDMI Connector 110. The HDMI connector 110 is a micro-HDMI connector i.e. the HDMI connector having a micro-HDMI plug. It is to be understood that the connector 110 can have a mini/micro HDMI plug, DP display port plug, USB-C plug, thunderbolt, or any other plug type compatible with an audio-video cable having control channel. Furthermore, it is shown in FIG. 1 is a pair of HDMI adaptors 140. These are used to convert the micro/mini HDMI interface to a regular size HDMI plug. The assembly disclosed herein comprises a first logic block and a second logic block paired with each other. Each the first logic block and the second logic block are circuitry that can be configured in the HDMI connectors 110. In one case, the first logic block can be configured in a proximal end connector 110 while the second logic block can be configured in a distal end HDMI connector 120. Serial ports 130 are shown to be extended from both the connectors 110 and 120. The serial port 130 can connect a receiver and a transmitter, wherein the receiver and transmitter receive and transmits the external signal. FIG. 1 shows a female 3.5 mm jack as the serial port, it is obvious that any know serial port can be used and is within the scope of the present invention.

Figure 2:
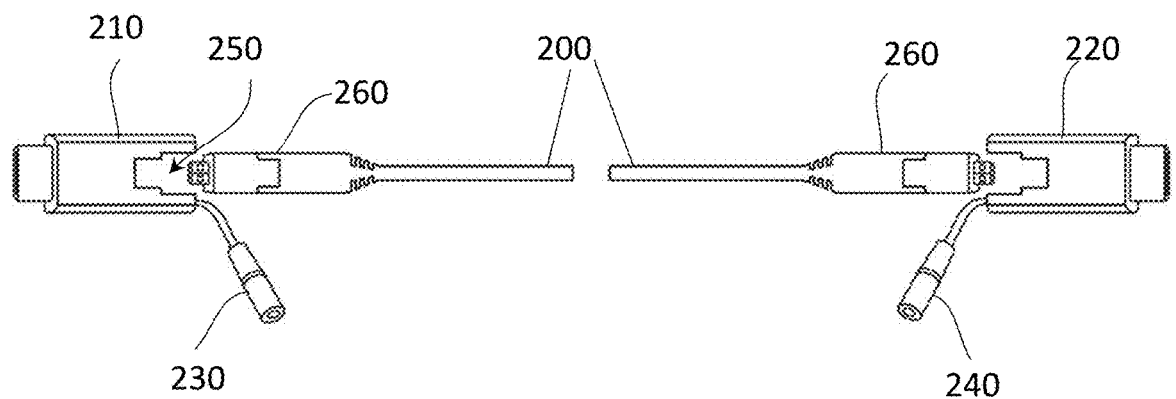
FIG. 2 shows the two serial ports extending from the two HDMI adaptors, according to an exemplary embodiment of the present invention.

In an alternate implementation, the first logic block and the second logic block can also be configured as an adaptor, HDMI adaptors in the case of HDMI cable. FIG. 2 shows a first HDMI adaptor 210 and a second HDMI adaptor 220. The first logic block can be configured as a first adaptor 210 and the second logic block can be configured as a second adaptor 220. A first serial port 230 extends from the first adaptor 210, and a second serial port 240 extends from the second adaptor 220. The serial ports function to connect with a transmitter or receiver. The receiver receives commands from an external source, such as an infrared remote control and the logic blocks transmit the external signal captured by the receiver over the control channel to the transmitter. The transmitter can send the external signal to a destined device, for example, a TV or set-top box. Each logic block can send the external signal as well as receive the signal. Thus, to either logic block, a transmitter or receiver can be connected through the serial ports.

In one implementation, a receiver can be connected to the first logic block 210 through the first serial port 230. A transmitter can be connected to the second logic block 220 through the second serial port 240. The assembly can function by first receiving an external signal by the receiver. The first logic block 210 can sense the capturing of the external signal by the receiver and dynamically switch the CEC channel from inline mode to the bypass mode. The first logic block 210 can then transmit the external signal over the CEC channel to the second logic block 220, and finally to the transmitter. Once, the external signal is transmitted, the first logic block can switch back the CEC channel to the inline mode. Such an arrangement provides one-direction signal communication i.e. the external signal flows from the first logic block to the second logic block. For bi-directional serial communication, each the first logic and the second logic can be provided with both the transmitter and the receiver. Thus, each logic block can both transmit and receive signals. HDMI cable 200 is having two mini-HDMI Connectors 260 at its ends. The adaptors 210 and 220 can be configured to receive the HDMI connectors 260, wherein the adaptor is having a latch mechanism 250 to latch the HDMI connectors 260. The latching prevents accidental disengagement of the HDMI connectors from the adaptors. The Adaptors include a standard size HDMI plug for connecting with HDMI ports of the sink and source devices.

Figure 3:
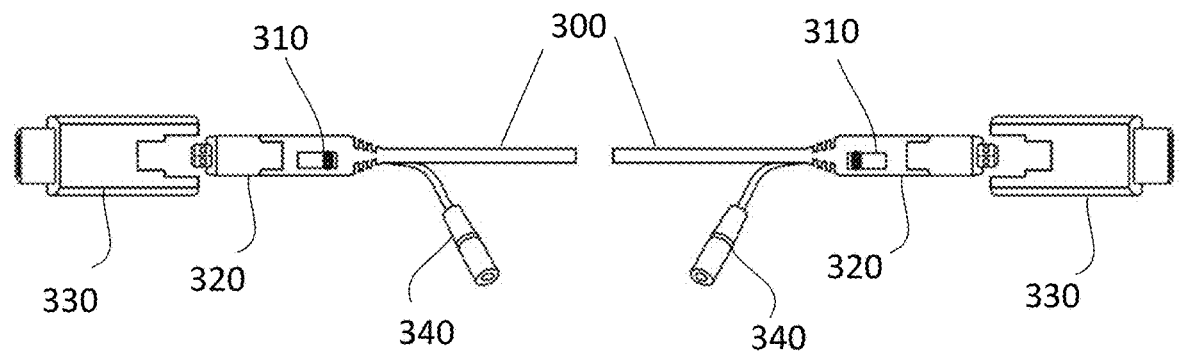
FIG. 3 shows the HDMI cable of FIG. 1, further having a switch configured on the HDMI connector, according to an exemplary embodiment of the present invention.

The assembly can also be configured for manually switching between the CEC channel between the two modes i.e. inline mode where CEC performs its normal function and the bypass mode wherein an external signal can be transmitted over the CEC channel. FIG. 3 shows the assembly having a switch 310. The switch can be used to manually switch the CEC channel between the two modes i.e. inline mode and bypass mode. In the inline mode, the CEC channel will carry the HDMI control channels and will not receive the external signal. While in the bypass state, the CEC channel can only transmit the external signal but not the HDMI control signals. FIG. 3 further shows cable 300 connected to HDMI connector 320. Furthermore, are shown the serial ports 340 and adaptors 330.

Figure 4:
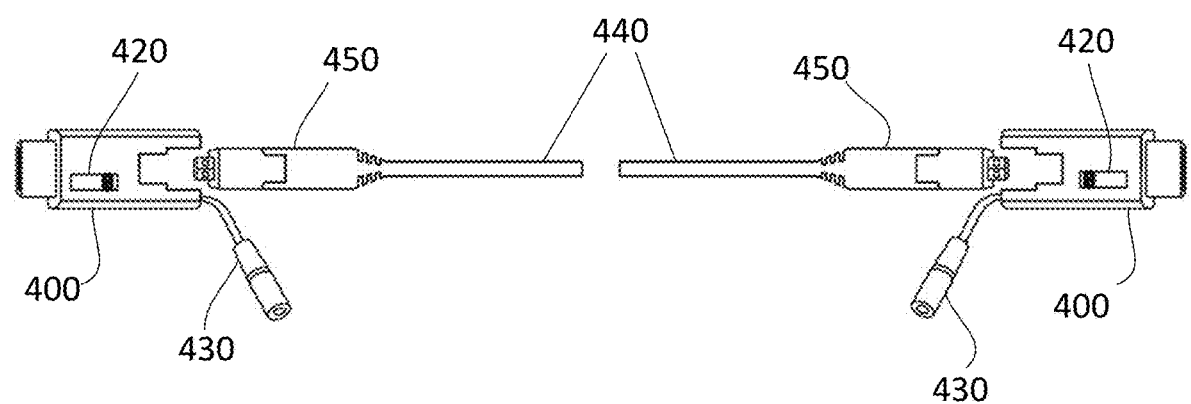
FIG. 4 shows the HDMI cable of FIG. 2, further having a switch configured on the HDMI adaptor, according to an exemplary embodiment of the present invention.

FIG. 4 shows an alternate implementation of the assembly, wherein the two logic blocks are configured as adaptors 400, wherein each adaptor is configured with a switch 420. A serial port 430 extends from the adaptor 400. The HDMI cable 440 connected to HDMI connectors 450.

Figure 5:
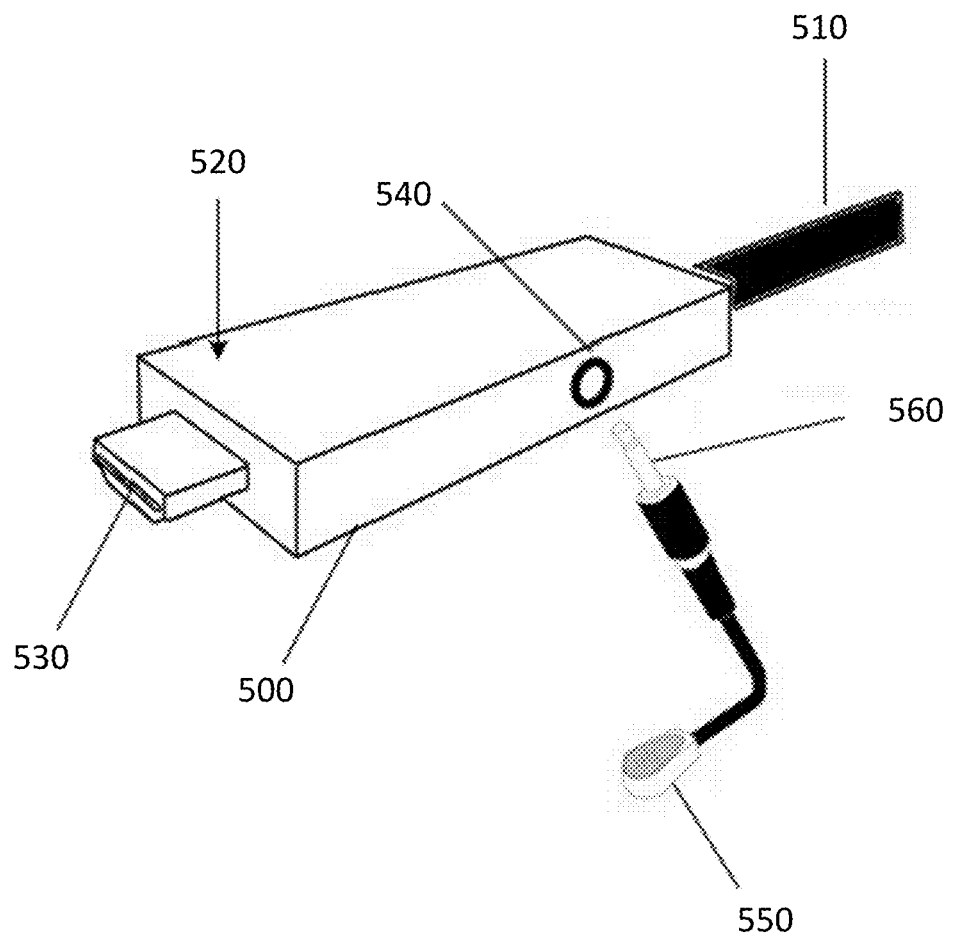
FIG. 5 shows an HDMI connector with built-in serial port and an IR eye with a jack, according to an exemplary embodiment of the present invention.
Figure 6:
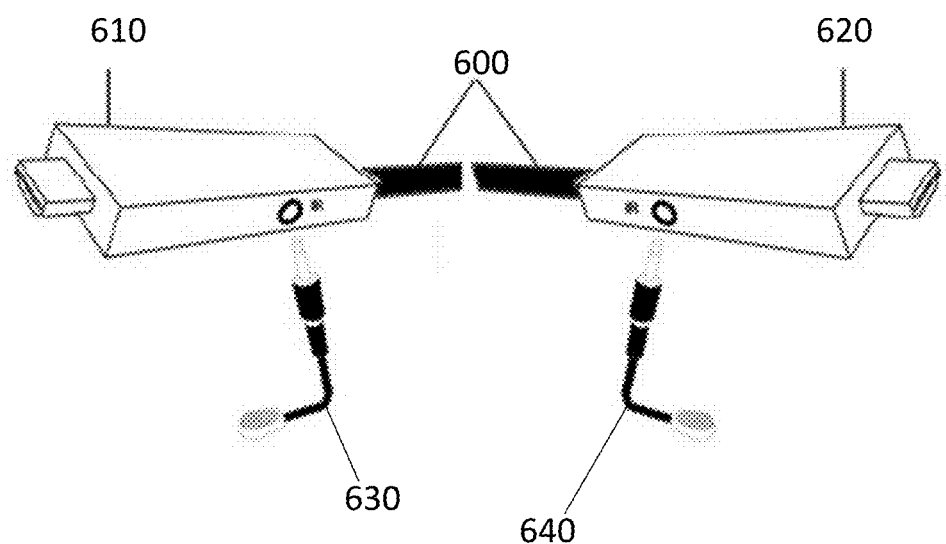
FIG. 6 shows a pair of HDMI connectors, each having a built-in serial port and two IR eyes, according to an exemplary embodiment of the present invention.

In FIG. 1-4, the serial ports are shown to be extended from the HDMI connector or the adaptor, as the case may be. However, the serial ports can also be built into the housing of the HDMI connector or the adaptor. FIG. 5 shows an HDMI connector 500 connected to an HDMI cable 510. The HDMI connector 500 is having a housing 520 and an HDMI plug 530 is shown extending from the housing 520. A serial port 540 is shown to be built into the housing 520. The serial port is a female 3.5 mm jack that can receive a 3.5 male jack. FIG. 5 further shown an IR eye 550 having a male 3.5 jack 560 that can be plugged into the serial port 540. The IR eye can be an IR transmitter or an IR receiver. FIG. 6 shows the HDMI cable 600 having a first HDMI connector 610 and a second HDMI connector 620 at opposite ends. A first IR eye 630 and a second IR eye 640 are also shown in FIG. 6. Each of the two IR eyes can include an IR transmitter, IR receiver, or both the transmitter and the receiver. The IR transmitter and the receiver provide for unidirectional and bidirectional remote control of the multimedia devices.

The assembly disclosed herein provides for integrated and dedicated IR functionality to facilitate the remote control of IR based multimedia devices, such as TV, media players, set-top boxes, disk players, AV receivers, Bluetooth devices, home automation devices, and like multimedia devices. The first IR eye can include an IR transmitter and the second IR eye can include an IR receiver. This provides the assembly disclosed herein unidirectional remote control capabilities. The IR receiver can receive an IR command from a remote control. The logic block of the assembly disclosed herein upon receiving the IR command can transmit the IR command over the CEC channel. The IR transmitter on the other end of the CEC channel can receive the IR command from the paired logic blocks. The IR transmitter can then transmit the IR command to a destined multimedia device. The IR transmitter can be installed in line-of-sight of the multimedia device. For example, the IR transmitter can send a command to a set-top box to turn-Off or change volume.

In an alternate embodiment, each of the pairs of eyes can have an IR transmitter and an IR receiver. This provides the assembly disclosed herein with bi-directional remote control capabilities. That is each IR eye can both receive an IR command from the remote control and transmit the IR command to the destined device. The IR eye receiving IR signals from a remote control can also transmit the IR signals received from the other IR eye, thus providing bi-directional capabilities to the assembly disclosed herein.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An assembly comprising:
    a first logic block configured to electrically couple with a proximal end of a cable, the cable comprising at least one channel configured for sending a control signal;
    a second logic block configured to electrically coupled with a distal end of the cable;
    a receiver electrically coupled to the first logic block, the receiver configured to receive an external signal;
    a transmitter electrically coupled to the second logic block, the transmitter configured to transmit the external signal,
    wherein each of the first logic block and the second logic block configured to switch the at least one channel between an inline mode and a bypass mode,
    wherein each of the first logic block and the second logic block configured to:
        sense the external signal,
        switch the at least one channel to the bypass mode,
        transmit the external signal,
        upon transmitting the external signal, switch the at least one channel to the inline mode.

2. The assembly of claim 1, wherein the cable is an HDMI cable and the at least one channel is a CEC channel.

3. The assembly of claim 2, wherein the HDMI cable is an optical fiber-based HDMI cable.

4. The assembly of claim 1, wherein the cable is an HDMI cable and the at least one channel is an HEC channel.

5. The assembly of claim 1, wherein the first logic block transmits the external signal to the second logic block, and the second logic block transmits the external signal to the transmitter.

6. The assembly of claim 1, wherein the assembly further comprises a second transmitter electrically coupled to the first logic block and a second IR receiver electrically coupled to the second logic block.

7. The assembly of claim 1, wherein the first logic block is configured in a first HDMI connector, and the second logic block is configured in a second HDMI connector, the first HDMI connector coupled to the proximal end of the cable, and the second HDMI connector coupled to the distal end of the cable.

8. The assembly of claim 7, wherein each the first HDMI connector and the second HDMI connector further comprises a serial port electrically coupled to the first logic block and the second logic block.

9. The assembly of claim 1, wherein the first logic block is configured as a first adaptor, and the second logic block is configured as a second adaptor, each the first adaptor and the second adaptor interrupts the coupling of the cable to a sink device and a source device.

10. The assembly of claim 9, wherein each the first adaptor and the second adaptor further comprises a serial port electrically coupled to the first logic block and the second logic block.

11. The assembly of claim 1, wherein the transmitter is an infrared signal transmitter and the receiver is an infrared signal receiver.

* * * * *